United States Patent [19]
Heeschen et al.

[11] Patent Number: 5,729,539
[45] Date of Patent: Mar. 17, 1998

[54] METHOD OF SCHEDULING SIGNAL QUALITY MEASUREMENTS IN A TDMA COMMUNICATION SYSTEM

[75] Inventors: David R. Heeschen, Coconut Creek; Jean Khawand, Miami; Gordon W. James, Boynton Beach, all of Fla.

[73] Assignee: Motorola, Inc., Schaumburg, Ill.

[21] Appl. No.: 642,740

[22] Filed: May 3, 1996

[51] Int. Cl.$^6$ ............................................. H04Q 7/00
[52] U.S. Cl. ............................................. 370/332
[58] Field of Search .................... 370/310, 328, 370/331, 332, 347; 455/33.1, 33.2, 38.3, 54.1, 54.2, 56.1, 436, 437, 439, 438, 442, 440; 379/59, 60

[56] References Cited

U.S. PATENT DOCUMENTS 5,159,593 10/1992 D'Amico et al. .
5,410,733 4/1995 Niva et al. ............................. 455/33.2
5,539,748 7/1996 Raith ................................... 455/33.1
5,574,996 11/1996 Raith ................................... 455/34.3

*Primary Examiner*—Douglas W. Olms
*Assistant Examiner*—Ajit Patel
*Attorney, Agent, or Firm*—Andrew S. Fuller

[57] ABSTRACT

A transceiver (107) operates in a TDMA communication system (100) with a primary server (102) and at least one other potential server (103). The transceiver (107) has defined transmit slots and defined receive slots for communication with the primary server. Mandatory transmit slots are identified from among the defined transmit slots according to a particular specification. The transceiver schedules signal quality measurements for the potential server based at least in part on the particular specification for identifying mandatory transmit slots (400).

6 Claims, 6 Drawing Sheets

METHOD OF SCHEDULING SIGNAL QUALITY MEASUREMENTS IN A TDMA COMMUNICATION SYSTEM

TECHNICAL FIELD

This invention relates in general to communication systems, and more particularly, to the taking of signal quality measurements, such as for hand-over decisions and the like.

BACKGROUND

Radio communication systems often support subscriber units distributed throughout a geographic area. Oftentimes, the geographic area is divided into cells, each of which is serviced by a cell server. A mobile subscriber unit operating within the system may move from one geographic cell to another. Preferably, a subscriber unit is handled by a particular cell server when the subscriber unit is within the geographic region serviced by the cell server. To support mobile subscriber units, the cell servers are ordinarily configured to provide overlapping geographic coverage. As a subscriber unit moves from one geographic area to another, the system provides a mechanism for a hand-over or hand-off of control of the subscriber unit from one cell server to another.

The prior art contains many approaches for performing hand-offs in a multi-server communication system. In a typical example, a subscriber unit monitors the quality of signals received from various cell servers and initiates a transfer of control from one cell server to another, depending on the quality of the monitored signals. In another example, the cell server determines the quality of received signal and uses this information to make hand-off decisions.

In a radio frequency (RF) time division multiple access (TDMA) communication system, multiple subscriber units share a number of time slots that are assigned by a system controller. System requirements often dictate that a subscriber unit perform certain functions to maintain operation within the system. Particularly, the system may designate specific time slots for the subscriber unit to perform receive operations. Similarly, time slots are designated for transmit operations. These time slots are generally periodic in nature. Most TDMA systems require periodic transmissions from a subscriber unit to maintain its assigned time slots within the system. When a subscriber unit is not receiving signal targeted at that subscriber unit, or is not transmitting signals, this time may be used for other subscriber unit functions. One such function is that of the monitoring of neighbor cell server transmissions in order to facilitate cell server hand-off operations.

In many prior art TDMA communication systems, the monitor period for a particular neighbor cell server may be affected by mandatory functions such as periodic transmission requirements. In certain cases, the particular neighbor cell server may be monitored for less than the minimum time required to fully characterize the quality of communication signals from that neighbor cell server with respect to the other cell servers. Thus, there may be inadequate or incorrect information on which hand-off decisions are based.

System requirements in TDMA systems may adversely impact a subscriber units ability to fully characterize the quality of neighbor cell server signals in order to make good hand-off decisions. It is desirable that an improved method be provided to schedule signal quality measurements for such purposes.

BRIEF DESCRIPTION OF THE PREFERRED EMBODIMENT

DETAILED DESCRIPTION OF THE PREFERRED EMBODIMENT

Generally, the present invention provides a method for scheduling signal quality measurements in a time division multiple access (TDMA) communication system. A transceiver operating in a TDMA system has a primary server and at least one other potential server. The transceiver has defined transmit and receive slots for communication of the primary server. The transceiver schedules signal quality measurements from one or more potential servers based on system imposed mandatory transmission rules. A particular specification determines the selection or identification of mandatory transmit slots from among the defined transmit slots. The transceiver transmits during the time duration corresponding to the mandatory transmit slots. Signal quality measurements for a potential server are scheduled based at least in part on the specification for selecting mandatory transmit slots. Preferably, time periods are designated for signal quality measurements which do not coincide with the mandatory transmit slots. When an initial schedule of signal quality measurements would conflict with mandatory transmit time slots, the signal quality measurement schedule is shifted based on the timing pattern for the mandatory transmit slots.

Figure 1:
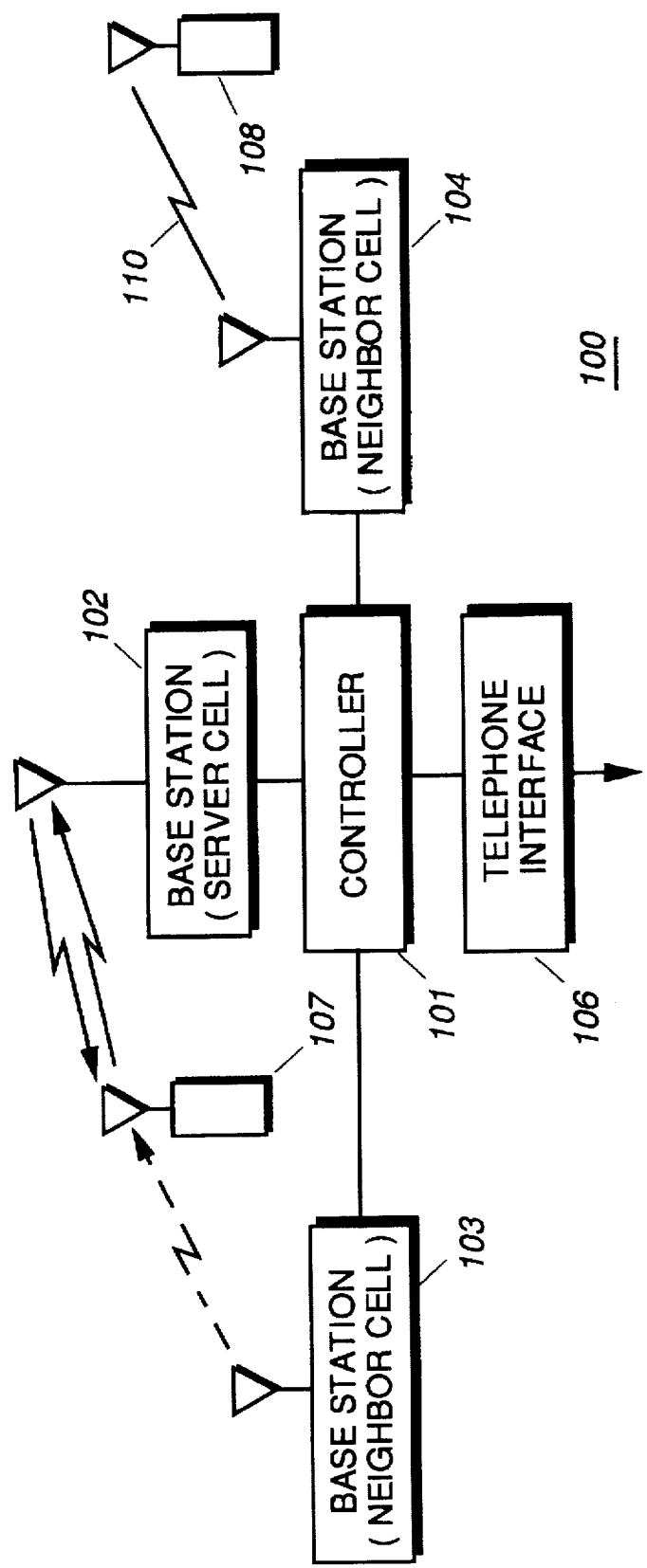
FIG. 1 is a block diagram of a time division multiple access (TDMA) radio communication system, in accordance with the present invention.

Referring now to FIG. 1, a block diagram of a communication system 100 is shown, in accordance with the present invention. The system 100 includes a controller 101 coupled to base stations 102, 103, 104, and interfaced to an external network through a telephone interface 106. The base stations 102, 103, 104 individually support portions of a geographic coverage area containing subscriber units or transceivers 107, 108. The transceivers 107, 108 interface with the base stations 102, 103, 104 using a TDMA protocol.

The geographic coverage area of the communication system 100 is divided into regions or cells, which are individually serviced by the base stations 102, 103, 104, also referred to herein as cell servers. A transceiver operating within the system 100 selects a particular cell server as its primary interface for receive and transmit operations within the system. For example, transceiver 107 has cell server 102 as its primary cell server, and transceiver 108 has cell server 104 as its primary cell server. Preferably, a transceiver selects a cell server which provides the best communication interface into the system. This ordinarily will depend on the signal quality of communication signals between the transceiver and the particular cell server. As a transceiver moves between various geographic locations in the coverage area, a hand-off or hand-over may be necessary to another cell server, which will then function as the primary cell server. According to the present invention, a transceiver monitors communication signals from base stations servicing neighboring cells to determine the most appropriate new server for hand-off purposes.

Figure 2:
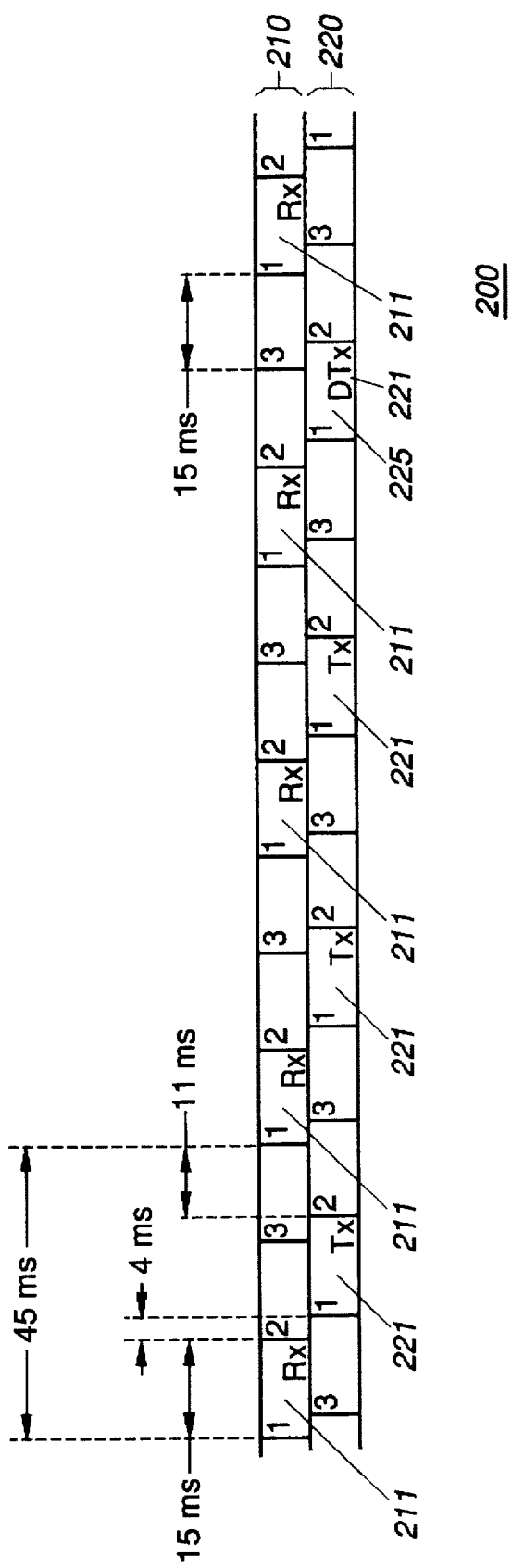
FIG. 2 is a block diagram of time slots allocated on receive and transmit channels in a three slot TDMA system, in accordance with the present invention.

FIG. 2 is a block diagram of a TDMA interface 200 showing receive and transmit channels 210, 220 for communication with a base station. Each channel 210, 220 of the TDMA interface 200 is organized into 45 millisecond communication frames of three 15 millisecond time slots. On the receive channel 210, a receive slot 211 occurs every third time slot. Similarly, on the transmit channel 220, a transmit slot 221 occurs every third slot. There is a four milliseconds time delay between the sequence of time slots on the receive and transmit channels. Consequently, there is a 4 millisecond delay between a receive time slot 211 and a subsequent transmit time slot 221, and an 11 millisecond time duration between a transmit time slot 221 and a subsequent receive time slot 211.

The transceiver receives communication from the base station on each receive slot 211 while a communication session is ongoing. A portion of the transmission from the base station may include control information used by the transceiver for synchronization and other control purposes. The transceiver transmits information to the base station using the transmit slots 221 as needed. Ordinarily, for power consumption reduction purposes, the transceiver does not transmit to the base station when there is no information to be transmitted. However, as in most TDMA systems, regularly transmissions from the transceiver are needed in order to maintain a communication session. Accordingly, specific transmit time slots are designated as mandatory transmit time slots in which the transceiver must make a transmission to the base station whether or not a transmission is needed. The periodicity or pattern of the mandatory transmit slots can be downloaded from a particular base station or preloaded into the transceiver.

According to the invention, a transceiver selects a particular base station as a primary cell server, based on the quality of communication signals expected between the transceiver and a particular base station. Ordinarily, signal quality is determined by measuring the signals strength of out bound signals from neighbor cell servers during time periods when the transceiver is not engaged in communication with its primary cell server. Generally, available potential servers are monitored for the signal quality of transmissions during non-busy time periods, and this information is used to determine the appropriate cell server to serve as the primary cell server when a hand-off is required. This monitoring is referred to herein as the taking neighbor cell measurements. Each neighbor cell server is monitored for a sufficiently long duration in order to properly characterize the quality of signal transmitted. Additionally, it is desirable to monitor each neighbor cell server for comparable time periods such that proper weighting is accorded to the relative signal quality of each. Preferably, neighbor cell measurements are taken over a full time slot in order to maximize the use of synchronization information ordinarily present in information transmitted by a neighbor cell server.

From the arrangement of receive and transmit time slots shown, it can be seen that when receiving and transmitting in the same frame, there is a short time slot of eleven milliseconds, which is available for taking neighbor cell measurements. When the transceiver is not transmitting during a particular frame, such as at time slot 225, a full time slot of 15 milliseconds is available for taking neighbor cell measurements. If neighbor cell measurements for different cell servers are scheduled consecutively, one in each open time slot, a shorter time period will be available for taking measurements at one or more neighbor cell servers. This could result in an unequal weighting for a particular neighbor cell measurement, if that neighbor cell server happened to be the one measured during the shortened time slot. This would be further exacerbated if the scheduled neighbor measurement coincided with periodically occurring mandatory transmit slots.

Figure 3:
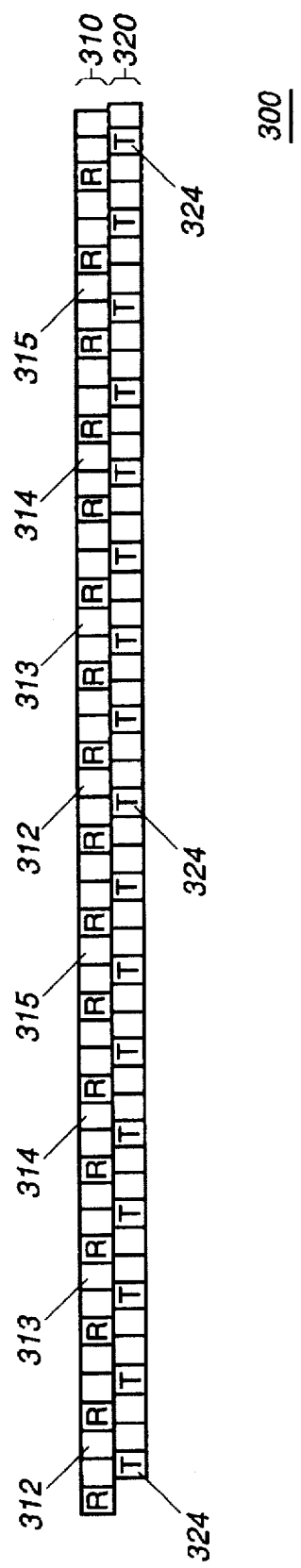
FIG. 3 is a block diagram of receive and transmit time slots in a three slot TDMA system, showing prior art scheduling of neighbor cell measurements.

FIG. 3 is a block diagram 300 showing transmit and receive channels 310, 320 divided into multiple time slots. Specific time slots 312, 313, 314, 315 have been identified which may be available for a periodically taking neighbor cell measurements for a set of four neighbor cell servers. Measurement slots occur with a periodicity of two, i.e., there is a measurement requirement every second frame. Additionally, mandatory transmit time slots 324 have been identified which occurs in a pattern or periodicity of one mandatory transmit time slot for every eight frames. As noted earlier, the transceiver does not transmit unless there is specific information to be transmitted. When the transceiver is not transmitting during a given transmit time slot, the transceiver has available a full time slot for taking neighbor cell measurements. When the radio has to transmit during a particular transmit time slot, only a portion of a full time slot, i.e., a short time slot, is available for taking the neighbor cell measurements. The neighbor cell measurement scheduled for a particular cell server 312 coincides with a mandatory transmit time slot 324. Thus, the neighbor cell measurement 312 would be always taken on less than a full time slot, i.e., a short time slot. This potential makes the primary cell server selection process less reliable. According to the present invention, the scheduling of neighbor cell measurements is based at least in part on the timing pattern of the mandatory transmit slots.

Figure 4:
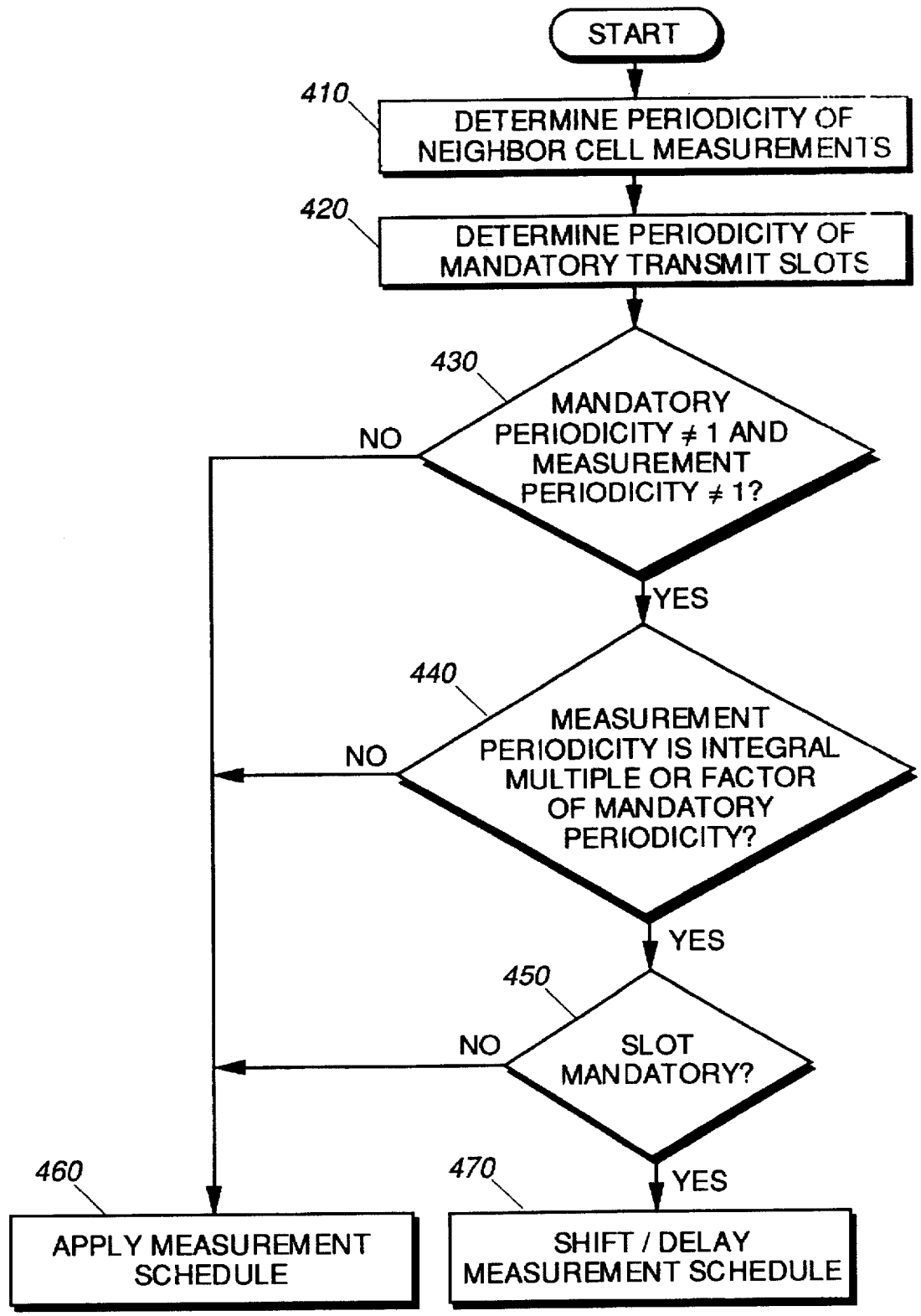
FIG. 4 is a flowchart of procedures for scheduling neighbor cell measurements, in accordance with the present invention.

FIG. 4 is flowchart of procedures for scheduling neighbor cell measurements, in accordance with the present invention. It is assumed that the transceiver is already operating in a TDMA system with a primary server and at least one other potential cell server. The transceiver has defined transmit slots and defined receive slots for communication with the primary server. The transmit slots include mandatory transmit slots based on a timing pattern downloaded from the primary server, or otherwise determined by the transceiver. The transceiver determines the periodicity of neighbor cell measurements, step 410. The periodicity of neighbor cell measurements may depend on the number of available cell servers, the method of determining the quality of neighbor cell server signals, or other parameters. The periodicity of mandatory transmit slots are also determined, step 420. Periodicity is defined with respect to the frame or cycle for recurring transmit slots. Transmit time slots are assumed to occur at regular intervals or at least to conform to a specific pattern. Each occurring transmit time slot signals the start of another frame. Periodicity information may be predetermined and made available to the transceiver before a neighbor cell measurement is requested.

When a neighbor cell measurement is requested, if the periodicity of the mandatory transmit slots is equal to one, i.e., every frame has a mandatory transmit slot, only a shortened neighbor cell measurement slot will be available, and thus the neighbor cell measurement is scheduled, steps 430, 460. If the measurement periodicity is equal to one, i.e., a neighbor cell measurement is required at every opportunity, the neighbor cell measurement is scheduled, steps 430, 460. However, if the periodicity of the mandatory transmit slots is not equal to one and the periodicity of the required neighbor cell measurements is not equal to one, then the neighbor cell measurement periodicity and the mandatory transmit time slot periodicity are compared to determine whether one is an integral multiple or factor of the other. If the neighbor cell measurement periodicity is an integral multiple or factor of the mandatory transmit time slot periodicity, step 440, and the current transmit time slot is the mandatory transmit time slot, step 450, then the neighbor cell measurement schedule is shifted or delayed until the next frame or cycle, step 470. Otherwise, a neighbor cell measurement is immediately scheduled or taken, step 460.

Thus, mandatory transmit time slots are selected or identified from among defined time transmit time slots for the transceiver according to a particular specification. The transceiver transmits when operating on the mandatory transmit time slots. Signal quality measurements are scheduled for at least one neighbor cell server based at least in part on the specification for selecting mandatory transmit slots. Preferably, the initiating of neighbor cell measurements is delayed until a subsequent communication frame when the transmit time slot for a current communication frame is a mandatory transmit time slot and the measurement periodicity is integral multiple or a factor of the mandatory transmit time slot periodicity.

Figure 5:
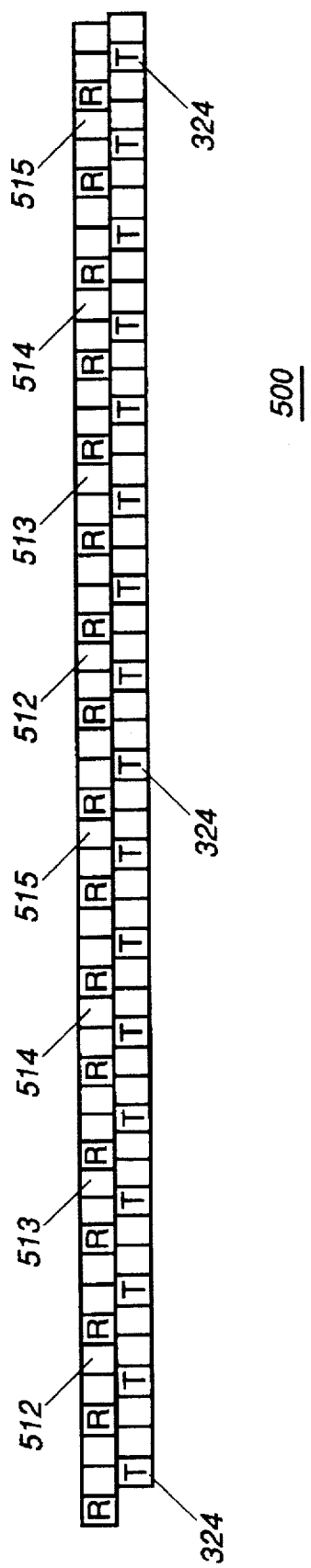
FIG. 5 is a block diagram of receive and transmit slots, as in FIG. 3, showing the scheduling of neighbor cell measurements, in accordance with the present invention.

FIG. 5 shows the block diagram 500 in which the scheduling of neighbor cell measurements are adjusted, in accordance with the present invention. By applying the procedures described above, neighbor cell measurements 512, 513, 514, 515 are taken according to a schedule shifted based at least in part on the timing pattern of the mandatory transmit slots 324.

Figure 6:
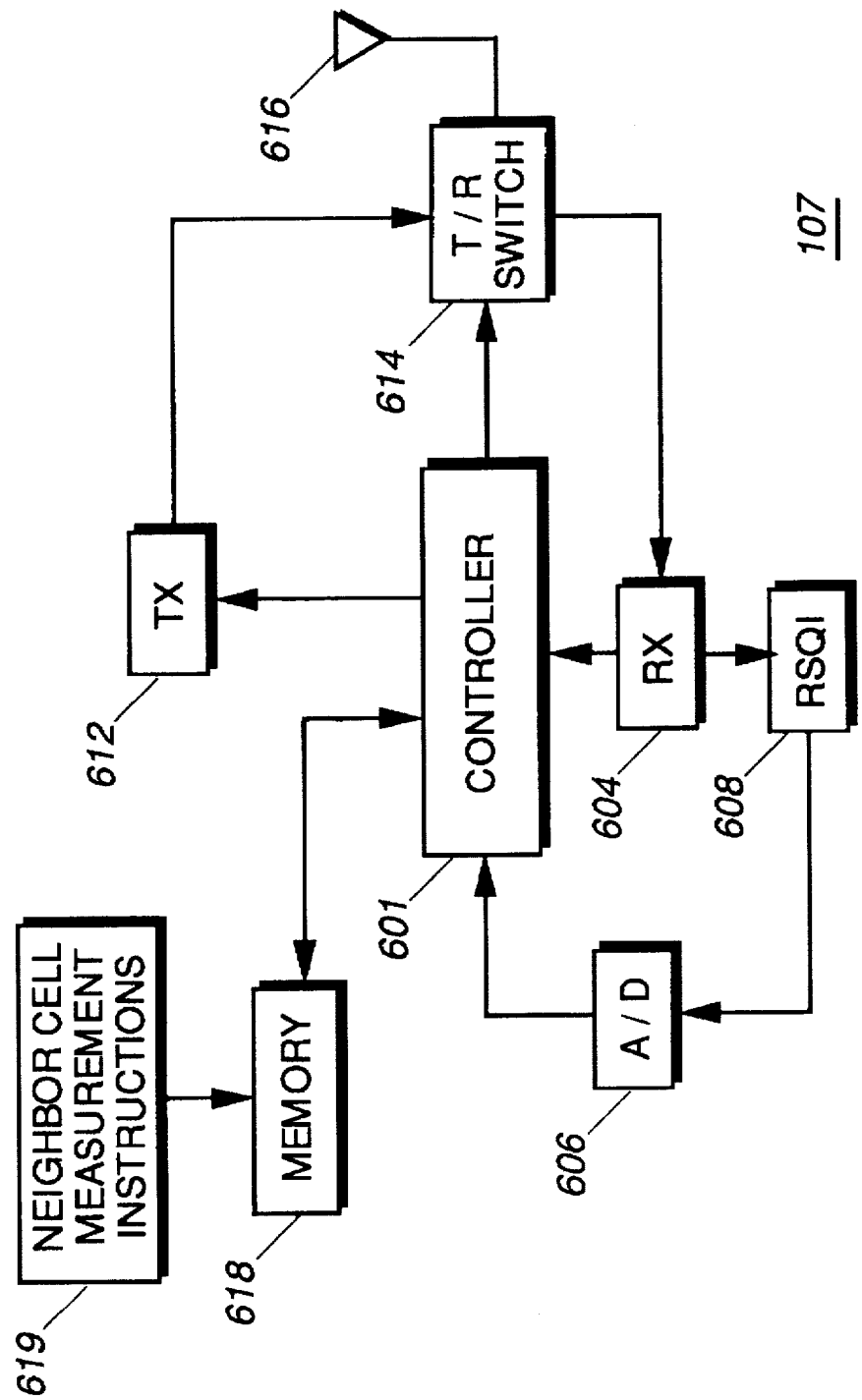
FIG. 6 is a block diagram of a radio transceiver incorporating the neighbor cell measurement scheduling procedure, in accordance with the present invention.

Referring to FIG. 6, a block diagram of the transceiver 107 is shown, in accordance with the present invention. The transceiver 107 is a two-way radio capable of receiving and transmitting radio frequency signals over a communication channel under a TDMA protocol. The transceiver 107 operates under the control of a controller 601 which switches the transceiver 107 between receive and transmit modes. In receive mode, the controller 601 couples an antenna 616 through a transmit/receive switch 614 to a receiver 604. The receiver 604 decodes the received signals and provides those decoded signals to the controller 601. In transmit mode, the controller 601 couples the antenna 616, through the switch 614 to a transmitter 612. The controller operates the transmitter and receiver according to instructions stored in memory 618. These instructions include a neighbor cell measurement scheduling algorithm 619 as described above. When a neighbor cell measurement is scheduled, the receiver 604, under the control of the controller 601, monitors neighbor cell servers and receives a received signal quality indicator (RSQI) 608 for signals transmitted by each monitored cell server. The RSQI 608 is converted to digital information by an analog-to-digital converter 606 and provided as input to the controller 601. Using this information, the transceiver 107 determines the most appropriate neighbor cell server to use as a primary cell server when hand-off is necessary.

The present invention offers significant advantages over the prior art. By incorporating knowledge of mandatory transmission requirements into the scheduling of neighbor cell server measurements, a more reliable hand-off process is provided. This results in a perception of higher quality and improved performance for transceivers incorporating the present invention.

What is claimed is:

1. In a transceiver operating in a time division multiple access communication system, the transceiver having a primary server and at least one other potential server, the transceiver having communication frames with defined transmit slots and defined receive slots for communication with the primary server, a method of scheduling signal quality measurements from the at least one other potential server, comprising the steps of:

identifying mandatory transmit slots from among the defined transmit slots according to a particular specification;

developing a schedule having regular intervals governing signal quality measurements over a plurality of communication frames for the at least one other potential server based at least in part on the particular specification for identifying mandatory transmit slots; and shifting the schedule in its entirety whenever the schedule causes a signal quality measurement to coincide with a mandatory transmit slot.

2. The method of claim 1, wherein the particular specification is downloaded from the primary server to the transceiver.

3. In a time division multiple access communication system having communication frames with corresponding transmit time slots allocated to a transceiver, the transmit time slots including mandatory transmit slots, a method in the transceiver, of scheduling signal based measurements for a plurality of neighbor cells, the method comprising the steps of:

obtaining a timing pattern for the mandatory transmit slots; upon obtaining the timing pattern, developing a schedule of intervals for taking neighbor cell signal based measurements for the plurality of neighbor cells over a plurality of communication frames;

developing the schedule to ensure that neighbor cell signal based measurement do not coincide with the mandatory transmit slots during any of the plurality of communication frames; and performing neighbor cell signal based measurements for the plurality of neighbor cells according to the scheduled.

4. In a time division multiple access communication system having communication frames with corresponding transmit time slots allocated to a transceiver, the transmit time slots including mandatory transmit slots, a method in the transceiver, comprising the steps of:

determining a timing pattern for the mandatory transmit slots; and taking neighbor cell signal based measurements according to a schedule shifted based at least in part on the timing pattern of the mandatory transmit slots, including the steps of:

determining a measurement periodicity, with respect to the communication frames, for the neighbor cell measurements;

determining a mandatory transmit slot periodicity with respect to the communication frames;

delaying initiation of neighbor cell signal based measurements until a subsequent communication frame, when:

the transmit time slot for a current communication frame is a mandatory time slot; and the measurement periodicity is an integral multiple of the mandatory transmit slot periodicity.

5. In a time division multiple access communication system having communication frames with corresponding transmit time slots allocated to a transceiver, the transmit time slot including mandatory transmit slots, a method in the transceiver, comprising the steps of:

determining a timing pattern for the mandatory transmit slots; and taking neighbor cell signal based measurements according to a schedule shifted based at least in part on the timing pattern of the mandatory transmit slots, including the steps of:

determining a measurement periodicity, with respect to the communication frames, for the neighbor cell signal based measurements;

determining a mandatory transmit slot periodicity with respect to the communication frames;

delaying initiation of neighbor cell signal based measurements until a subsequent communication frame, when:

the transmit time slot for a current communication frame is a mandatory time slot; and the mandatory transmit slot periodicity is a factor of the measurement periodicity.

6. In a time division multiple access communication system having communication frames with corresponding transmit time slots allocated to a transceiver, the transmit time slots including mandatory transmit slots, a method in the transceiver, comprising the steps of:

determining a timing pattern for the mandatory transmit slots; and taking neighbor cell signal based measurements according to a schedule shifted based at least in part on the timing pattern of the mandatory transmit slot, including the steps of:

determining a measurement periodicity, with respect to the communication frames, for the neighbor cell signal based measurements;

determining a mandatory transmit slot periodicity with respect to the communication frames;

delaying initiation of neighbor cell signal based measurements until a subsequent communication frame, when;

the transmit time slot for a current communication frame is a mandatory time slot;

the mandatory transmit slot periodicity is an integral multiple of the measurement periodicity, or the measurement periodicity is an integral multiple of the mandatory transmit slot periodicity;

the mandatory transmit slot periodicity is not equal to one; and the measurement periodicity is not equal to one.

\* \* \* \* \*